United States Patent [19]
McDonald

[11] 3,729,775
[45] May 1, 1973

[54] APPARATUS FOR REMOVING THE SKIN FROM VERTEBRATES SUCH AS FISH & ANIMALS

[76] Inventor: Emery L. McDonald, 10395 Wunderlich Drive, Cupertino, Calif. 95014

[22] Filed: July 26, 1971

[21] Appl. No.: 166,128

[52] U.S. Cl. ............................................ 17/62, 17/50
[51] Int. Cl. ............................................. A22c 25/17
[58] Field of Search ..................... 17/21, 62, 11, 50

[56] References Cited

UNITED STATES PATENTS

| | | | |
|---|---|---|---|
| 2,477,289 | 7/1949 | De Moss | 17/21 |
| 2,620,510 | 12/1952 | Darrow et al | 17/11 |
| 2,861,293 | 11/1958 | Platt | 17/11 |

FOREIGN PATENTS OR APPLICATIONS

| | | | |
|---|---|---|---|
| 152,281 | 7/1953 | Australia | 17/21 |

Primary Examiner—Lucie H. Laudenslager
Attorney—Leslie M. Hansen

[57] ABSTRACT

A machine in which pulling rollers are covered by a countertop lid having an opening in a depressed portion thereof exposing the pinchline between the rollers and providing a guard with one edge of the opening overlying the inwardly turning quadrant of one roller to the pinchline thereof and the opposite edge of the opening disposed to expose the inwardly turning quadrant of the other roller to enable feeding of one flank of an eviscerated fish or animal to be fed into the pinchline and be cleaved from the flesh as it rolls in unison with the pulling action and rotative contact with the exposed quadrant of such other roller whereby the meat is flipped over and guided upwardly and out of the depressed area by the guard overlying the upper quadrant of the adjacent roller.

10 Claims, 4 Drawing Figures

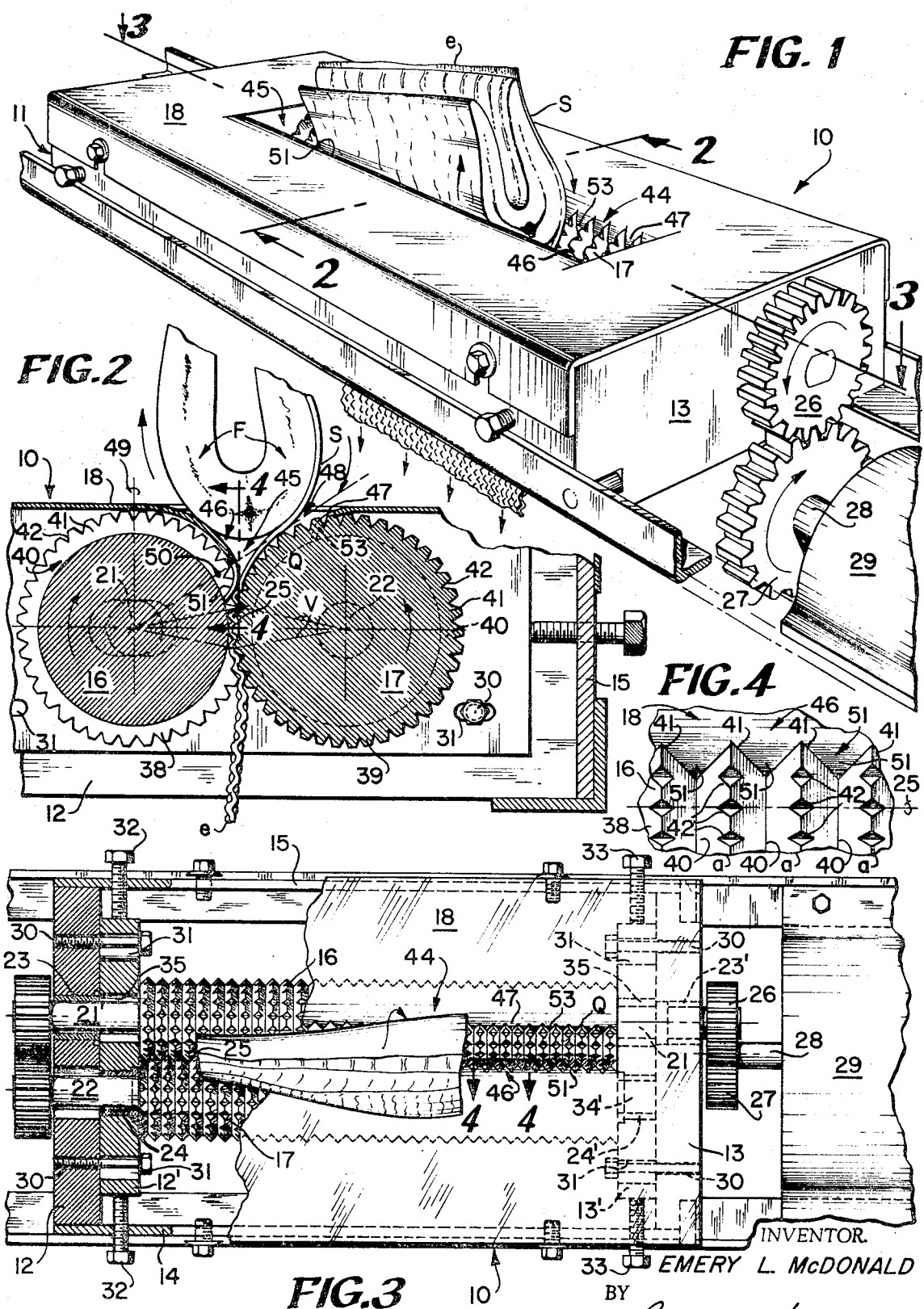

APPARATUS FOR REMOVING THE SKIN FROM VERTEBRATES SUCH AS FISH & ANIMALS

BACKGROUND

This invention relates to apparatus for removing the skin from animal matter and more particularly to removing the skin from fish or animal meat preparatory to marketing thereof.

In the skin removing art it appears that apparatus for removing the skin from poultry gizzards is the closest found. Other fields of search revealed that tendon pullers and sinew pullers have some structural similarity to the apparatus of the present invention. In general a pair of oppositely rotating rollers is used to pull the skin, tendons or sinew from the meat as shown and described in my co-pending application Ser. No. 7951 filed Feb. 2, 1070 for Tendon Pulling Machine on which U.S. Pat. No. 3,613,153 was granted Oct. 27, 1971. In such prior known tendon and sinew pulling art, resistance of the bone structure or the meat itself to direct pulling action of the rollers is required. In the case of gizzard skinners, the gizzards being of tough consistency enables the handling thereof directly in contact with the pulling means.

Such prior known skinners do not, therefore lend themselves to the removal of skin from the delicately structured meat of fish or animals. Consequently the skinning of fish and animals has been largely done by hand, a costly and time consuming operation.

STATEMENT OF INVENTION

The present invention is directed to apparatus so constructed as to protect the relatively delicate meat of fish or animals from being torn or mutilated during stripping of the skin therefrom. To this end the present invention while equally applicable to animals is especially directed to the removal of skin from meat and flesh of delicate characteristics such as that of catfish, bullheads and the like which are now being commercially raised for market.

Accordingly it is an object of the present invention to provide a skin pulling device with means for guarding the delicate meat of fish and the like from coming into direct contact with the pulling means. This object contemplates the provision of a guard plate overlying parallel pulling rollers and especially built to provide an opening between opposing guard sides conforming partially to the rollers and as close as possible to the pinchline of such rollers whereby only the skin contacts the rollers while being fed therebetween.

With the foregoing object in mind it is a further object of the present invention to provide a depressed guard plate so constructed as to enable the delicate meat from which the skin is removed to be turned gently in conformity with the speed of withdrawal of the skin therefrom so that upon completion of the skinning operation the meat alone lies in a depressed area of the guard plate.

It is yet another object of the present invention to provide a guard plate with its opening in a depressed area thereof formed by opposite edges of the opening conforming substantially to the circumference of the respective pulling rollers at opposite sides of the pinchline thereof.

It is a still further object to dispose one of the opposing edges of the opening in the depressed area in close proximity to the pinchline of the rollers and the other or opposite edge of such opening spaced segmentally from the pinchline whereby a quadrant of the roller therebeneath will contact the lead portion of skin and induce entry thereof into such pinchline. In this connection it is an object to further provide a structure by which the skinned flesh will be guided for rotation within the depressed area of the guard plate in unison with and by reason of the pulling action upon the skin by the pulling rollers to enable cleavage of the skin from the meat of the flesh.

These and other objects and advantages of the present invention will become apparent in the following specification in the light of the accompanying drawing in which:

FIG. 1 is a perspective view of a skinning apparatus embodying the present invention;

FIG. 2 is a fragmentary cross sectional view of FIG. 1 taken substantially along line 2—2 thereof;

FIG. 3 is a plan view of FIG. 1 with parts broken away for purpose of illustration; and FIG. 4 is a fragmentary elevation looking toward the drive roller at the pinchline and taken along line 4—4 in FIG. 2.

Referring to the drawing the skinning apparatus, generally designated 10, comprises a frame 11 provided with end walls 12 and 13 spaced from each other any desired length, at least the length of the body of an animal or the fish to be skinned by the machine. Each of the end walls 12 and 13 are joined by side walls 14 and 15 which may be secured by machine screws, welding and the like to the respective side edges of the end walls. The end walls 12 and 13 are of a width sufficient to receive a pair of rollers 16 and 17 therebetween plug such additional width as may be required to provide a counter top work space. This countertop work space is in the form of a cover or lid 18 overlying the frame 11 and preferably hinged thereto as at 19 along one side 15 of the frame to enable access to the interior chamber 20 of the apparatus 10.

The rollers 16–17 are arranged within the chamber 20 provided by the frame 11. These rollers 16–17 are journaled on the end walls 12 and 13 by means of reduced shafts 21 and 22 respectively. The rollers 16–17 are so journaled as to tangently engage each other along what is called a pinchline 25 in the horizontal plane of the axis of the rollers.

One of the rollers 16 has the ends of its shaft 21 journaled in bushings 23—23' mounted in the end walls 12 and 13 and extending through the wall 13 to receive a gear 26. The gear 26 is disposed to mesh with a gear 27 secured to the drive shaft 28 of a motor 29, exteriorly of the chamber 20. The other roller 17 has the ends of its shaft 22 journaled in bushings 24—24' mounted in auxiliary end walls 12' and 13' adjustably secured to the end walls 12 and 13, respectively, by bolts 30 threaded into the latter. The bolts 30 extend through horizontally extending slots 31 formed through the auxiliary end walls 12' and 13' to enable horizontal shiftability of the latter relative to the end walls 12 and 13. Adjusting screws 32–33 are thread through each sidewall 14 and 15 and have their ends engaging the respective side edges of the auxiliary end walls 12' and 13'. The ends of the shaft 21 extend through horizontal slots 35 in each auxiliary end wall 12 and 13. The shaft 21 is therefore at a fixed axis upon bushings 23—23' on the end walls 12 and 13 while the shaft 22 is shiftable horizontally with the auxiliary end walls 12'-13'. Thus the auxiliary end walls are shiftable as well as maintained in the desired positions of adjustment within the frame. The rollers 21 and 22 are thus drivingly related for rotation in opposite directions inwardly from their inner, upper quadrants, toward the pinchline 25, i.e., downwardly between their inner, upper-most quadrants (FIG. 2). The horizontal adjustment afforded by this arrangement enables a spacing of the surfaces 38 and 39 of the rollers from each other along the pinchline 25 to compensate for variations in thickness of the hide or skin to be removed from the meat being skinned. It should therefore be noted that the inverse rotation of the rollers 21 and 22 is accomplished through the gears 36 and 37 and not necessarily at the pinchline 25. It should also be noted that that end 34 of the shaft 22 of roller 17 adjacent the end wall 13 may extend through a slot (not shown) formed in the latter, as in the case of slot 35 in end wall 12, to receive a gear adopted to mesh with gear 27 at the drive side of the frame 11. In conformity with the present invention the rollers 21 and 22 may have equal drive relation at either or both their ends if necessary to empower the skinning operation required.

In the case of skinning catfish and the like as depicted in the drawings, a minimum drive relation between the rollers 21 and 22 has been found sufficient. In all cases, however, the surfaces 38 and 39 of the rollers are V grooved as at 40 in spaced relation along their length to provide pointed annulose 41 on each roller. Moreover, these pointed annulose 41 of one roller are offset relative to those on the opposite roller so that the apex a of the pointed annulus of one such roller fits into a V groove of the other roller. By this arrangement the pinchline 25 becomes a zig-zag meeting line as distinguished from a straight line parallel to the rollers. In addition to the foregoing each pointed annulus 41 on each roller 21 and 22 is notched as at 42 transverse to its V shape, i.e., lengthwise of the roller. These notches 42 are preferably V grooves about half the depth of each pointed annulus 41 for further assuring good gripping relation with a skin or hide fed between the rollers and despite the spaced relation of the latter along the pinchline 25 as required by reason of the thickness of the hide or skin being fed therethrough. It will be noted by the diverging radial lines v in FIG. 2 that a gripping action is afforded in a segmental range above and below the normal meeting line between the rollers 21 and 22. Thus a firm non-slip grip and constant pulling action is applied to the skin or hide passing between the rollers at the zig-zag pinchline 25.

Most important to the skinning operation of delicate meats, such as fish and the flesh of animals, is the guarding thereof against mutilation by the pulling rollers 21 and 22. In accordance with the present invention the guarding action is provided by an uniquely formed guard 44 having an opening 45 in the cover 18 overlying the rollers 21 and 22 within the chamber 20. As best illustrated in FIGS. 1 and 2 this opening 45 is provided by slitting the lid 18 lengthwise whereby the meeting portions 46 and 47 on each side of the slit are formed to provide the guard 44. The guard 44 is formed by bowing the meeting portions 46 and 47 of such slit inwardly toward the rollers to provide the cover 18 with a depressed area 48. The opening 45 and depressed area 48 preferably extend the entire length of the gripping surfaces 38 and 39 of the rollers 21 and 22.

Referring to FIG. 2 it will be noted that the cover 18 lies closely adjacent the upper extremities of the two rollers 16 and 17.

The meeting portion 46 of the guard 44 overlying the roller 16 is bowed circumferentially parallel about the latter for a segment between a vertical radius 49 from the shaft 21 to a radius 50 from center of the latter and substantially tangent to the opposite roller 17. The extreme edge 51 of the meeting portion 46 is serrated with V notches matching the V grooves 40 in the roller 16. The notched edge 51 of the portion 46 is abruptly bowed inwardly toward the roller 16 so that the apexes thereof extend into the grooves 40 of the roller 16. Preferably the apexes of the inwardly bowed notched edge 51 of portion 46 contact the bottoms of the V grooves 40 and are worn-in by prerotation of the roller 16 to conform to the shape thereof.

The opposite meeting portion 47 of the guard 44 overlies the roller 17, but has its extreme edge 53 bowed abruptly inwardly toward the latter at a line vertically above the axis of shaft 22 (FIG. 2). The extreme edge 53 of portion 47 also has V notches formed therein, the apexes of which extend into the grooves 40 in the surface 39 of roller 17. It will therefore be noted in FIGS. 1, 2 and 3 that the inwardly moving quadrant Q of roller 17 is completely exposed at the opening 45. By this arrangement when the meat to be skinned, such as a fish F is placed in the depressed area 48 of the countertop cover 18 the skinside of the meat will be in contact with quadrant Q of the roller 17 and be caused to roll (clockwise FIG. 2) in the direction of rotation of roller 17. As in all vertebrates the skin has a subcutaneous stratum between the keratin layer and the flesh which is a natural line of cleavage. In the case of fish F which has been eviscerated, one edge e of the skin S on one flank of the opening in the belly of the fish is first fed into the opening 45 of the guard 44. The skin side of the fish F is thus resting on the quadrant Q of the roller 17. The belly edge e of the skin S is thus drawn into the pulling rollers 16 and 17 at the pinchline 25 while the meat M of the fish bears against the downwardly curved meeting portion 46 of the guard 44. The extreme edge 51 of portion 46 having its serrated notches 52 close to the pinchline 25 serves to guard against the meat M entering therebetween or engaging the drive roller 16. Consequently, the unskinned portion of the fish F engaged by the quadrant Q of roller 17 causes the fish to turn therewith and the meat of the fish to cleave from the skin and be guided upwardly the portion 46 of the guard 44 as the skin S only is pulled into and between the pulling rollers 16 and 17. By reason of the speed of rotation of the rollers 16-17 the body of the fish turning therewith is quickly flipped over as the skin is removed and withdrawn. The action is so speedy that the skinning operation is almost imperceptible. The flesh is so completely denuded of skin that little or no handwork is required. Moreover, the delicate meat of the fish is neither torn nor mutilated, but appears to have an outer layer, stratum granulosum, of smooth and firm characteristics. By the skinning apparatus 10 thus constructed one person is able to skin hundreds of fish such as catfish in an hour as distinguished from the tedious and time consuming method of skinning by hand.

The apparatus of the present invention may be equally efficient in removing the skin or hide from the butchered carcasses of animals such as lambs, sheep, calves, and beef. Small animals such as rabbits and the like may also be skinned in a similar manner.

While I have described the apparatus for removing skin from vertebrates, such as fish and animals, in specific detail it will be appreciated by those skilled in the art that the structure may be varied, altered and/or modified without departing from the spirit or scope of the appended claims.

I claim:

1. In an apparatus for removing the skin from the flesh of animal matter by means of a pair of pulling rollers journaled in a frame having adjacent upper quadrants thereof turning inwardly toward a pinchline therebetween, means for removing the skin from delicate eviscerated meat such as fish and the like slit along the belly line thereof comprising in combination:
   1. a countertop cover on such frame overlying the rollers therein and having an opening formed lengthwise and parallel thereto between opposite meeting portions bordering the opening in said cover;
   2. each of said meeting portions being depressed inwardly about the respective roller therebeneath to provide a depressed area and guard in said countertop cover;
   3. one of said meeting portions of the opening extending circumferentially parallel to and overlying the inner upper quadrant of the roller therebeneath and terminating in close proximity to the pinchline between such rollers; and
   4. the opposite meeting portion overlying the other one of the rollers terminating substantially vertically above the axis of the latter whereby the eviscerated meat lying skin side upon the exposed inner upper quadrant of said other one of the rollers is turned by the latter as the skin at one edge of the meat entering said pinchline is pulled by the rollers downwardly therebetween and cleaved from the eviscerated meat as the latter is guided upwardly and out of the depressed area and guard by said one of said meeting portions overlying the inner upper quadrant of said one of the rollers.

2. The apparatus in accordance with that of claim 1 in which the peripheral surface of each of the pulling rollers are V grooved annularly in spaced relation along their length to provide pointed annulose on each of the rollers and in which the V grooves of one of the rollers are offset relative to those of the other roller such that the pointed annulus of said one such roller match and fit into the V grooves of said other roller at the pinchline therebetween to provide a zig-zag meeting line between the rollers.

3. The apparatus in accordance with that of claim 2 including means on said frame for mounting one of the pulling rollers for lateral movement toward and from the other one of the rollers to compensate for variations in thickness of skin of the animal matter to be skinned.

4. The apparatus in accordance with that of claim 3 in which the pointed annulus of each of the pulling rollers includes notches formed transversely, i.e., lengthwise of the rollers.

5. The apparatus in accordance with that of claim 4 in which the transverse notches in the pointed annulus of each pulling roller extends inwardly the peripheral surface thereof substantially midway the depth of the V grooves formed therein.

6. The apparatus in accordance with that of claim 5 in which the transverse notches in the pointed annulus of one of the pulling roller are offset segmentally relative to the transverse notches in the pointed annulus of the other roller.

7. The apparatus in accordance with that of claim 6 in which the offset match and fit of the pointed annulus and V grooves of the pulling rollers provide a skin gripping range segmentally of the rollers to either side of the zig-zag pinchline therebetween.

8. The apparatus in accordance with that of claim 7 in which extreme edge of the inwardly depressed meeting portions on each side of the opening of said countertop cover are serrated with V notches conforming to the pointed annulus of the pulling roller therebeneath and extend into the grooves thereof.

9. The apparatus in accordance with that of claim 8 in which the serrated V notched extreme edge of each of said meeting portions is bowed abruptly inwardly into the V grooved periphery of the pulling roller therebeneath.

10. The apparatus in accordance with that of claim 8 in which the inwardly bowed V notches serrated extreme edge of said one of said meeting portions conform to and extend into bearing relation with the V grooved periphery of the roller therebeneath in close proximity to the pinchline between such rollers for guiding the skinned flesh of the animal matter engaging the latter upwardly and out of the depressed area in said countertop cover as the skin of said animal matter is pulled downwardly through the pinchline of the rollers.

* * * * *